US 8,434,329 B2
May 7, 2013

(12) United States Patent
Singer

(54) APPARATUS FOR USE IN THE GLASS INDUSTRY AND METHOD FOR PROCESSING MOLTEN GLASS

(75) Inventor: Rudolf Singer, Engelstadt (DE)

(73) Assignee: Umicore AG & Co. KG, Hanau-Wolfgang (DE)

(*) Notice: Subject to any disclaimer, the term of this patent is extended or adjusted under 35 U.S.C. 154(b) by 486 days.

(21) Appl. No.: 12/527,643

(22) PCT Filed: Feb. 18, 2008

(86) PCT No.: PCT/EP2008/001232
§ 371 (c)(1),
(2), (4) Date: Jan. 19, 2010

(87) PCT Pub. No.: WO2008/101649
PCT Pub. Date: Aug. 28, 2008

(65) Prior Publication Data
US 2010/0139322 A1     Jun. 10, 2010

(30) Foreign Application Priority Data
Feb. 19, 2007 (DE) .......................... 10 2007 008 102

(51) Int. Cl.
*C03B 5/18* (2006.01)
(52) U.S. Cl.
USPC .......................................... 65/178; 65/135.3
(58) Field of Classification Search ................. 65/134.1, 65/135.2–135.4, 178
See application file for complete search history.

(56) References Cited

U.S. PATENT DOCUMENTS

| | | | |
|---|---|---|---|
| 3,332,766 A | | 7/1967 | Ambrogi |
| 3,498,778 A | * | 3/1970 | Hynd .............................. 65/178 |
| 2002/0014093 A1 | | 2/2002 | Walser et al. |
| 2002/0046586 A1 | | 4/2002 | Singer et al. |
| 2003/0101750 A1 | | 6/2003 | Goller et al. |
| 2006/0042318 A1 | | 3/2006 | Burdette et al. |
| 2008/0006610 A1 | * | 1/2008 | Hamashima et al. ........ 219/59.1 |

FOREIGN PATENT DOCUMENTS

| | | |
|---|---|---|
| DE | 25 00 793 A1 | 7/1975 |
| DE | 43 26 143 A1 | 12/1993 |
| DE | 44 40 702 A1 | 7/1996 |
| DE | 44 40 704 A1 | 8/1996 |

(Continued)

OTHER PUBLICATIONS

DE 44 40 702 (Schwieger et al.) Jul. 11, 1996 (English language machine translation of document cited in applicant's IDS dated Oct. 13, 2009). [online] [retrieved Feb. 27, 2012]. Retrieved from: Espacenet.*

(Continued)

*Primary Examiner* — Matthew Daniels
*Assistant Examiner* — Erin Snelting
(74) *Attorney, Agent, or Firm* — Smith, Gambrell and Russell, LLP

(57) ABSTRACT

Apparatus, which is suitable for being surrounded by molten glass, the apparatus having a shank which has at least one at least partially seamless tube consisting of an oxide dispersion-strengthened PGM material, the shank having at least one thickened portion on which an actuating device is arranged.

44 Claims, 14 Drawing Sheets

FOREIGN PATENT DOCUMENTS

Figure 1:
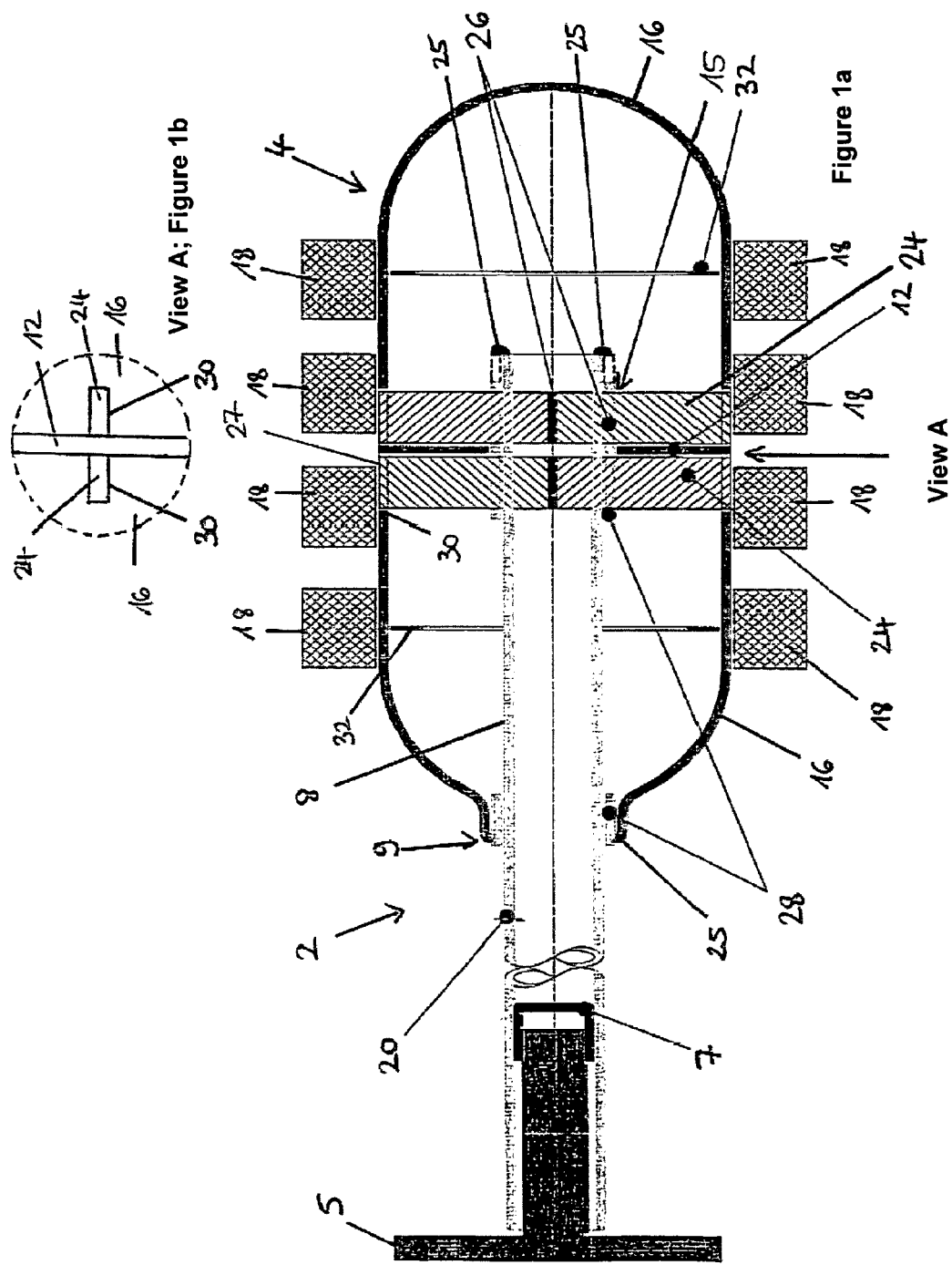

| | | |
|---|---|---|
| DE | 198 09 878 A1 | 9/1999 |
| DE | 201 21 350 U1 | 9/2002 |
| DE | 10 2004 018148 A1 | 11/2005 |
| DE | 10 2004 032795 A1 | 2/2006 |
| JP | 58 009830 A | 1/1983 |
| JP | 02 009725 A | 1/1990 |
| JP | 2001 180943 | 7/2001 |
| WO | WO 2005/049512 A | 6/2005 |

OTHER PUBLICATIONS

Written Opinion issued in priority International Application No. PCT/EP2008/001232 filed on Feb. 18, 2008.

Coupland et al., "New Stirrer Technology for the Glass Industry", Platinum Metal Review (published by Johnson Matthey Plc), vol. 49, issue 2, Apr. 2, 2005, 11 pages.

Dolgoshevn, N.I., et al.: "Platinum Stirrers for Molten Glass Feeders", Glass and Ceramics, Springer New York; vol. 49, No. 8/6 (May 1, 1992) pp. 297-298.

Anonymous: "Platinum Stirrer for Stirring Molten Glass", Research Disclosure, Mason Publications, Hampshire GB, vol. 394, No. 34 (Feb. 1, 1997).

\* cited by examiner

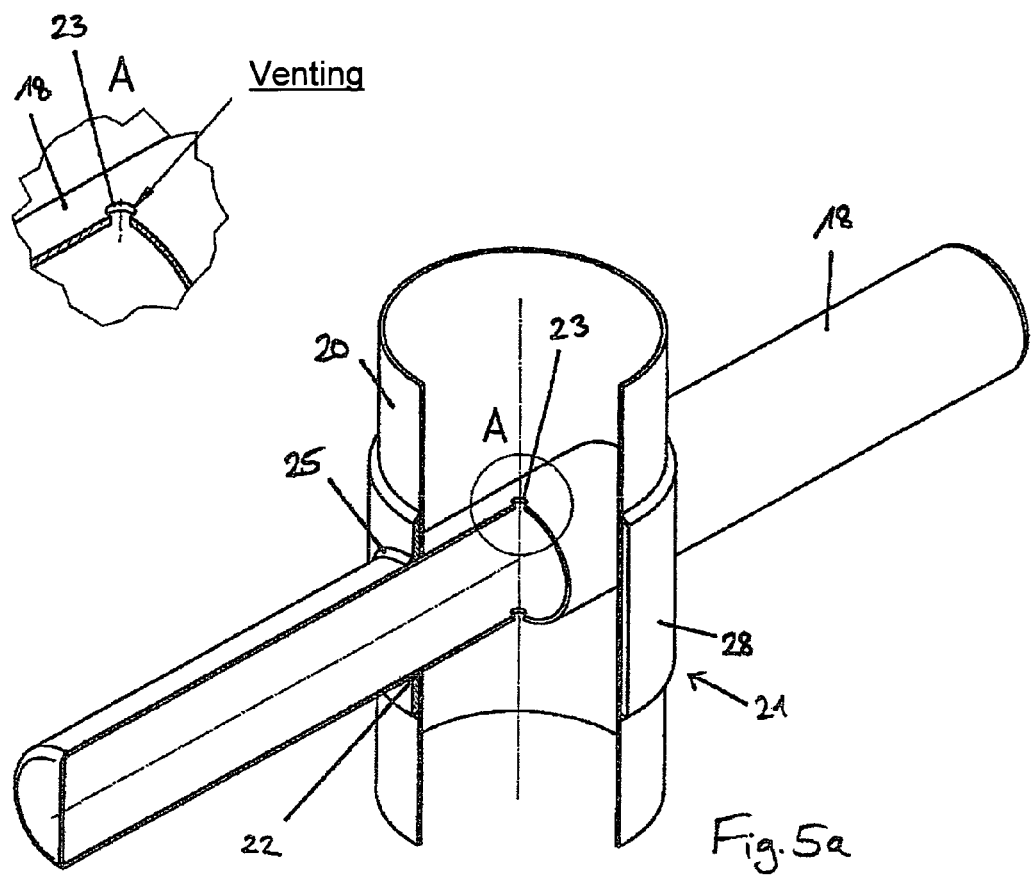

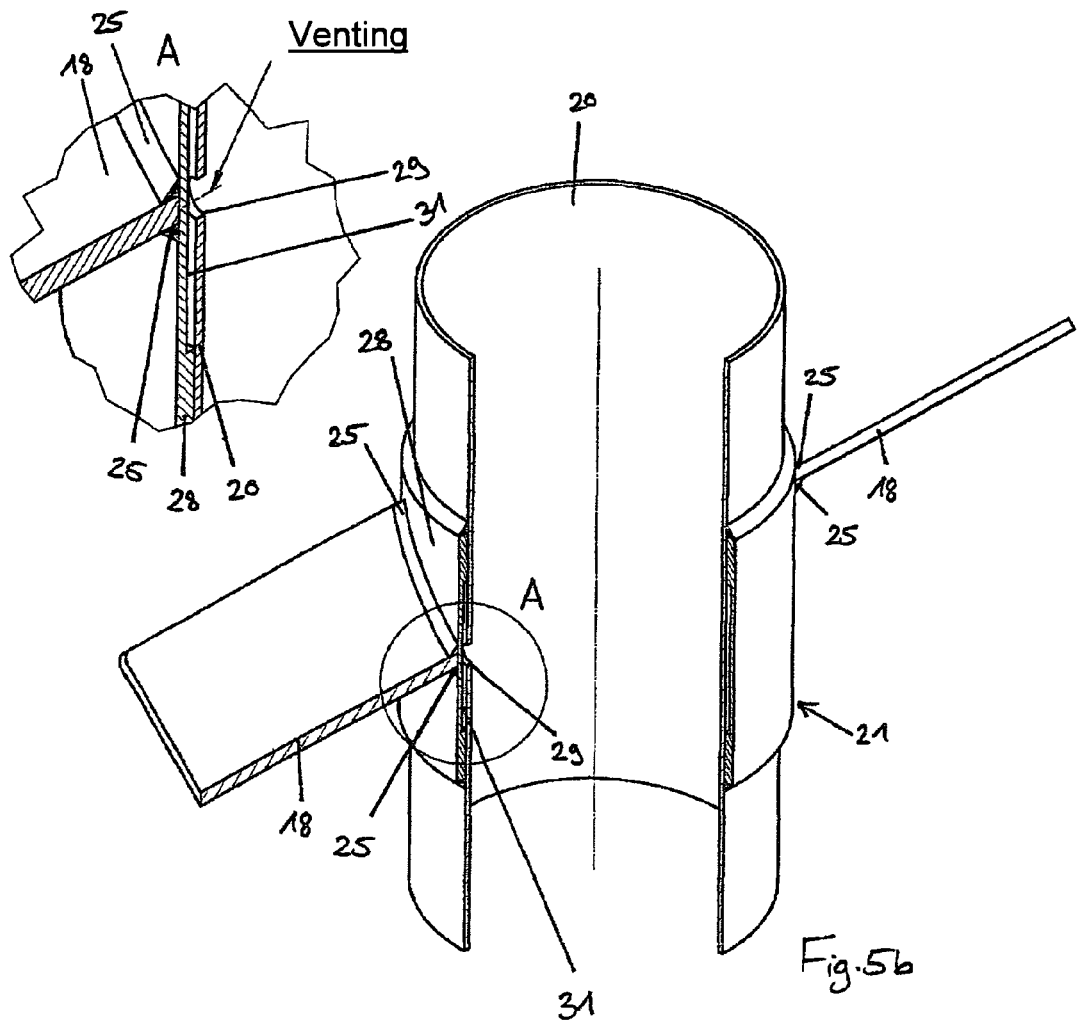

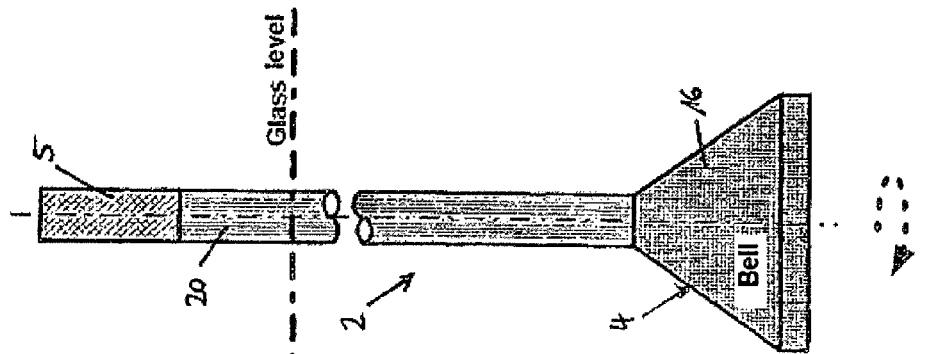
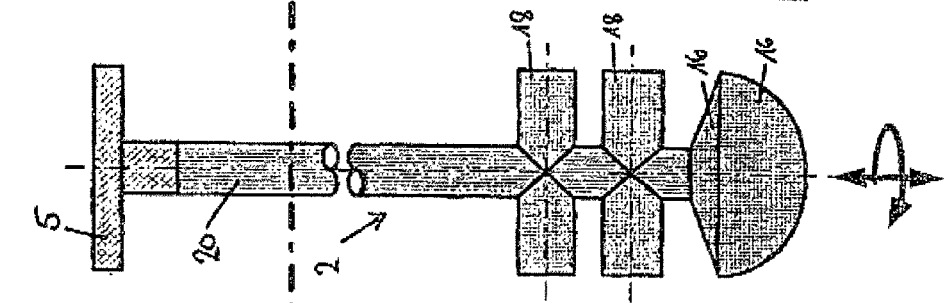
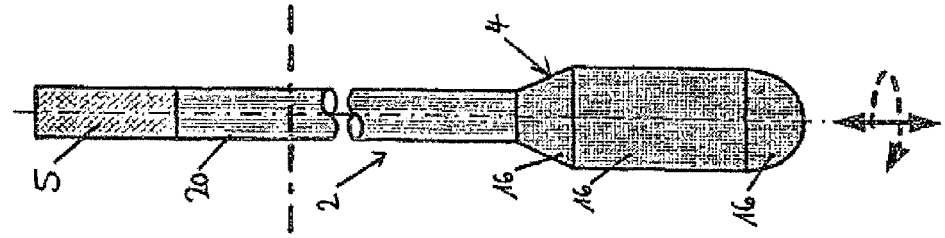
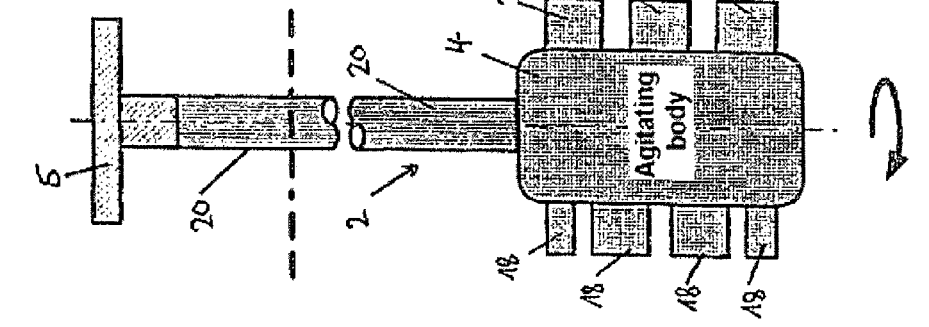

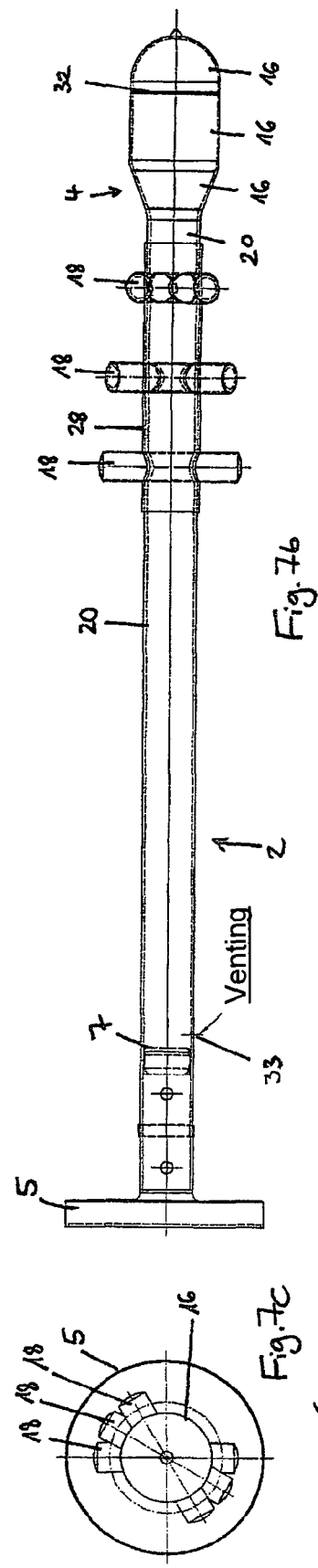
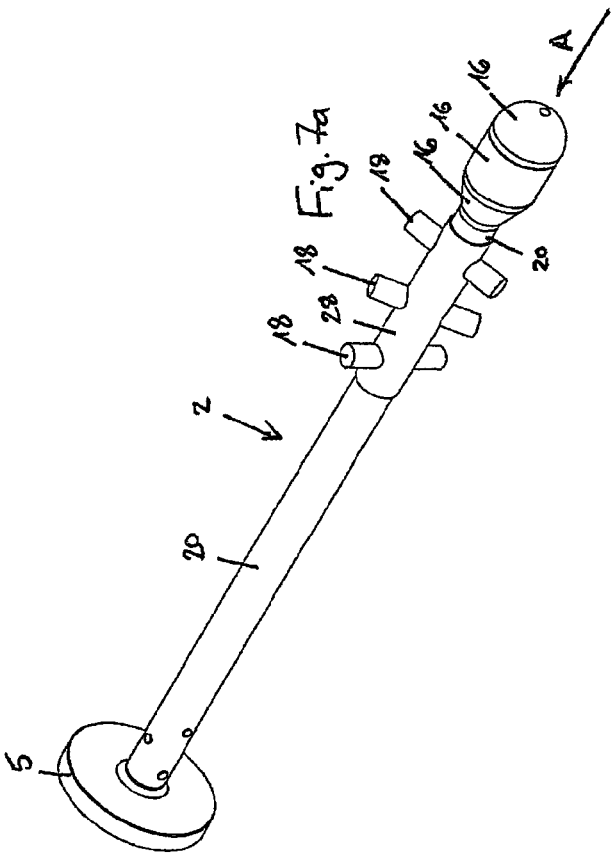

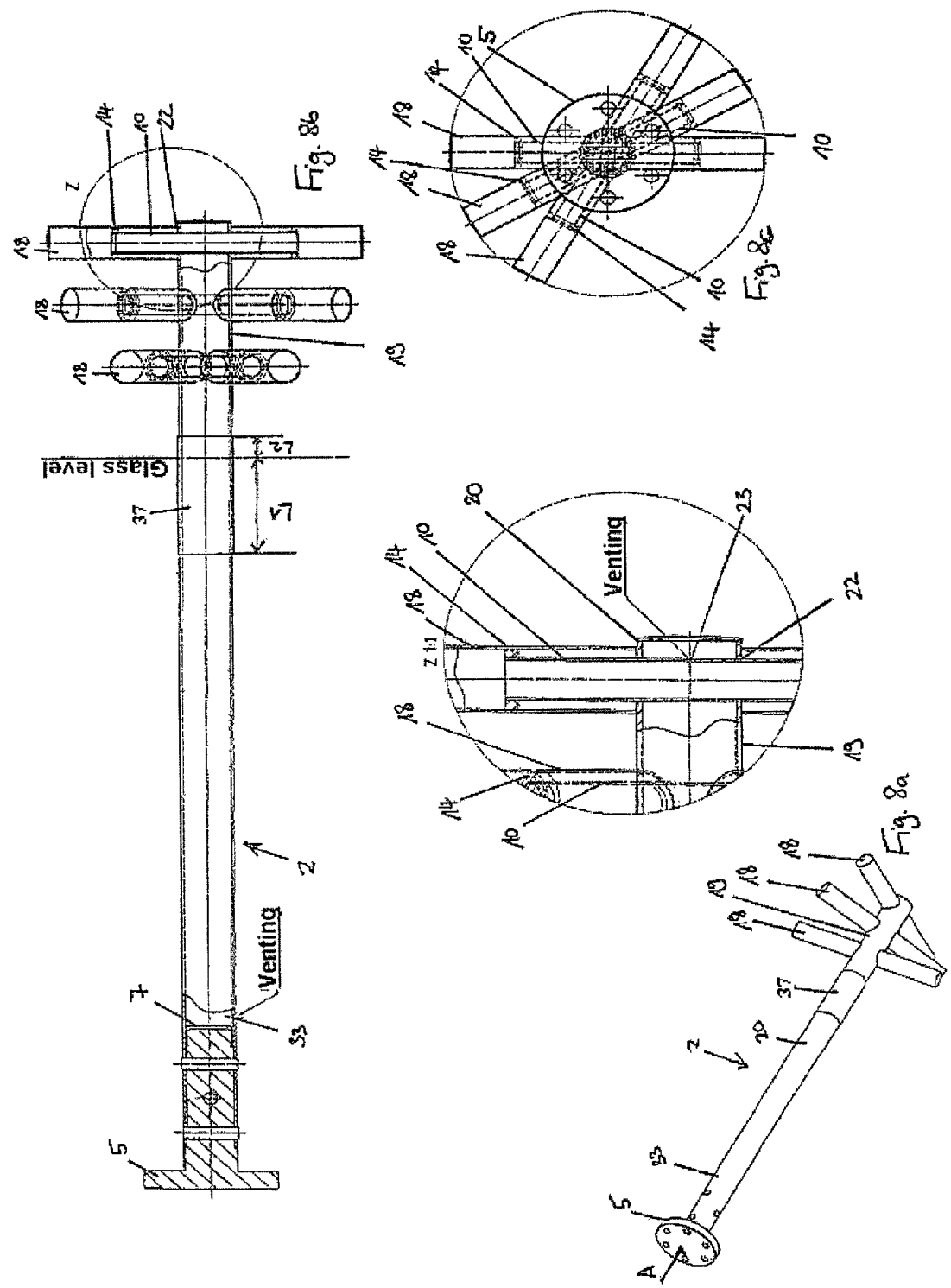

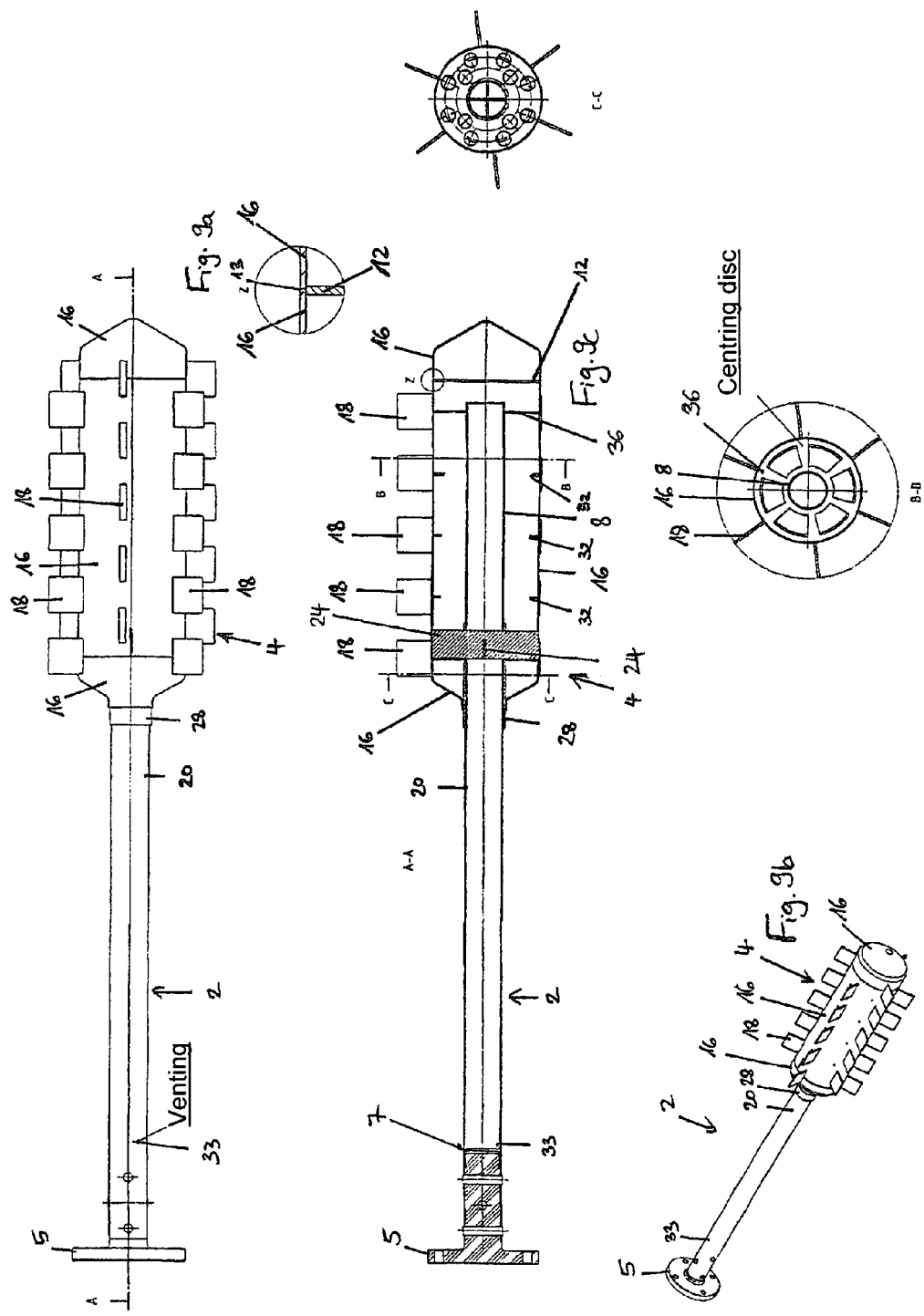

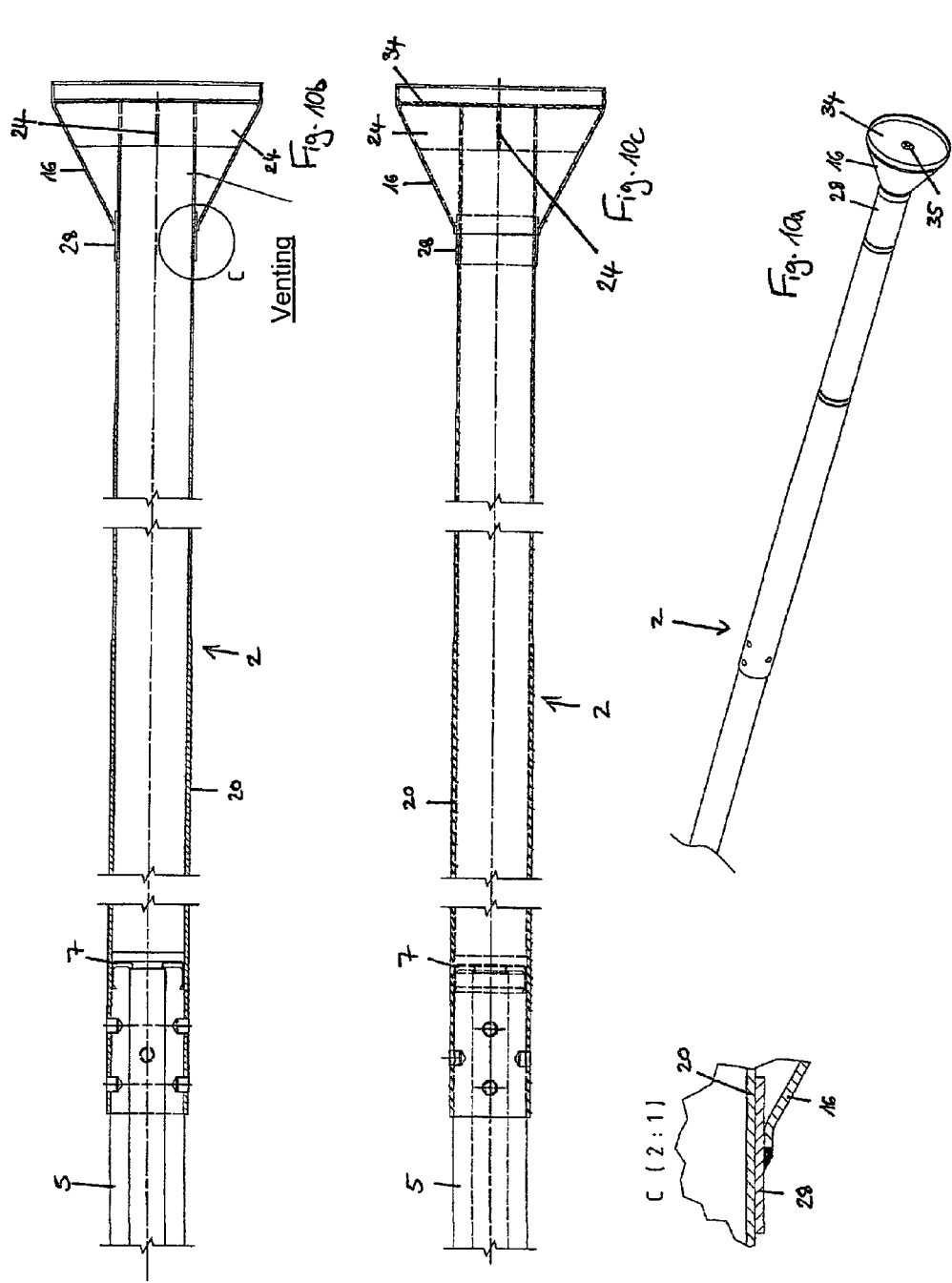

Venting

Figure 12 a: Sheet-like elements
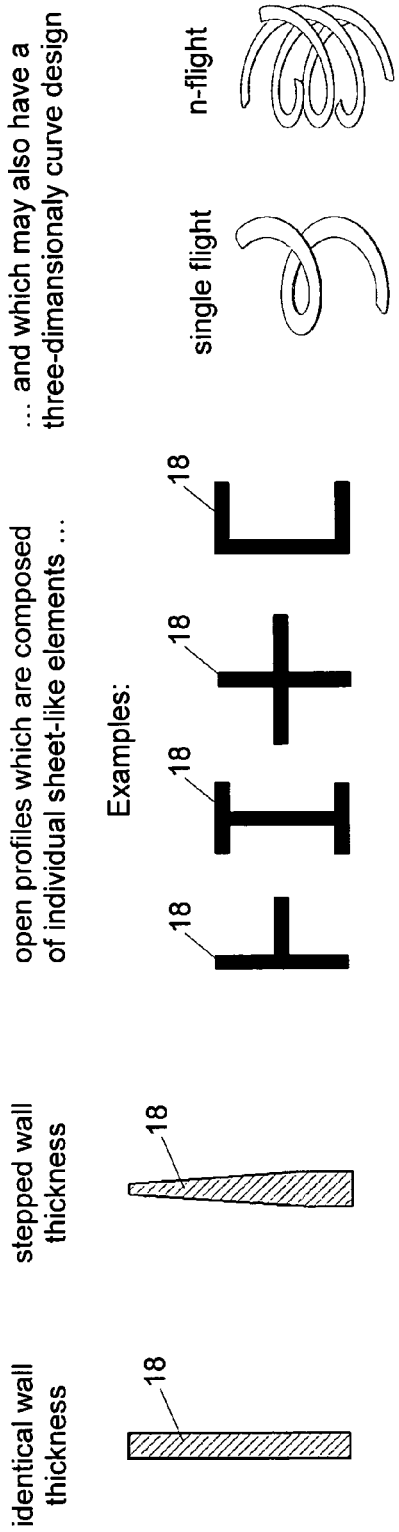
Figure 12 b: Closed profiles
(which may also have a three-dimensionally curved design):
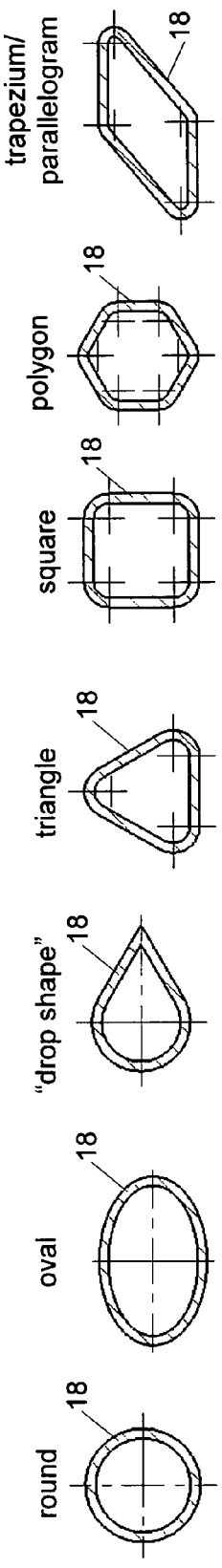

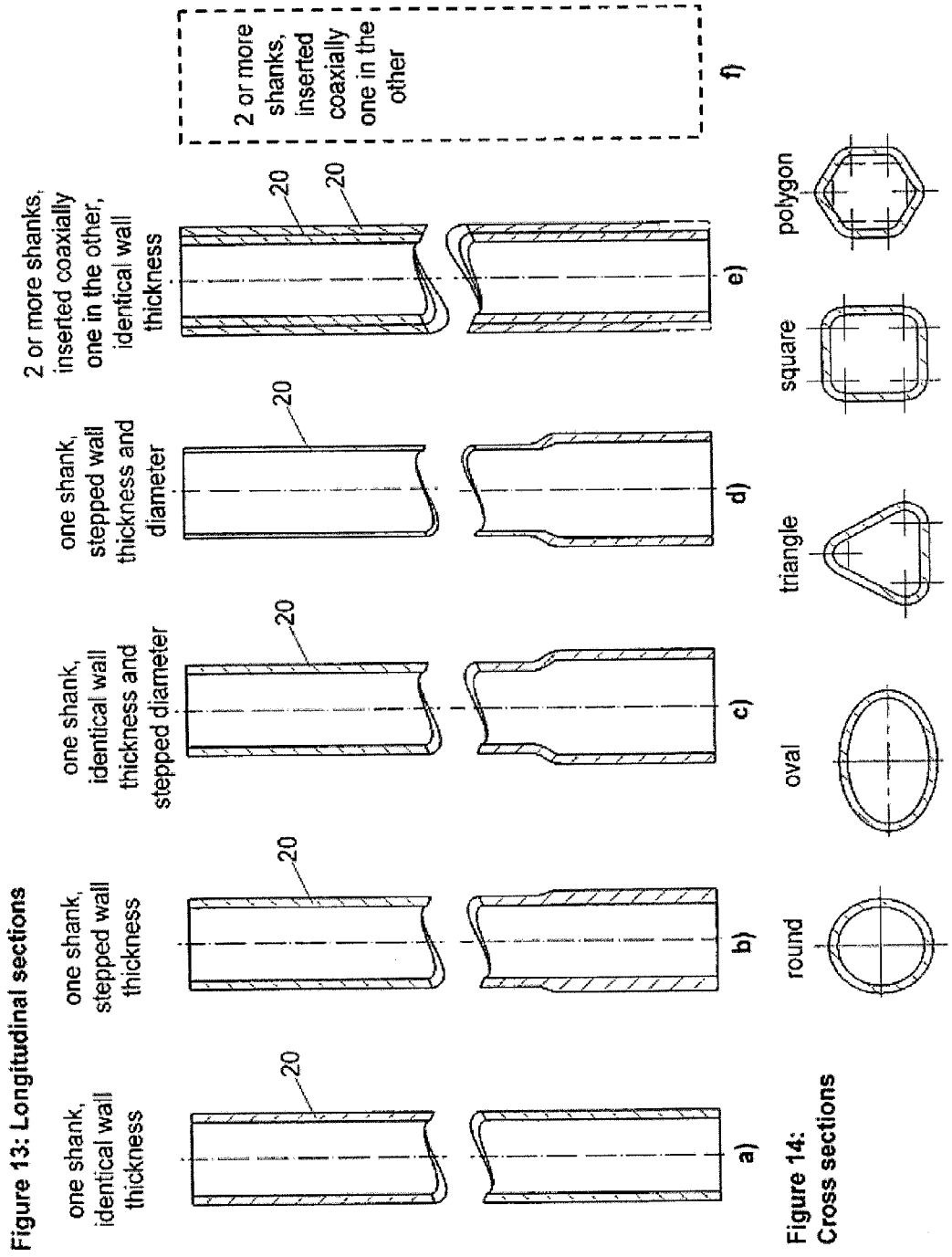

APPARATUS FOR USE IN THE GLASS INDUSTRY AND METHOD FOR PROCESSING MOLTEN GLASS

INTRODUCTION AND BACKGROUND

The invention relates to an apparatus which is suitable for being surrounded by molten glass and which may be designed, for example, in the form of an agitator, a needle, a plunger or rotary plunger or a Vello or down-draw needle, in order to be used in the glass industry, for example, for homogenizing molten glass. The invention relates, furthermore, to a method for processing molten glass, in which the apparatus is used.

Structural parts consisting of high-grade metal or high-grade metal alloys, such as preferably PGM materials, are employed in the glass industry, particularly in plants for the melting and hot forming of special glass. These plant components used in fusion technology, also called PGM (Platinum Group Metals) products, serve for melting, refining, transporting, homogenizing and portioning liquid glass.

Such structural parts, are essentially either structures consisting of solid PGM material or of materials resistant to high temperature, such as ceramic refractory materials or metallic special materials, with a thin-walled PGM cladding, for example, in the form of thin sheet metal or of a PGM surface coating which is applied, for example, by plasma spraying or flame spraying.

Plant parts carrying glass melt are often noble metal sheet structures which are designed as thin-walled pipe systems. The molten glass flows through these at temperatures of between 1000° C. and 1700° C. The pipe systems, as a rule, are surrounded on the outside by an insulating and, if appropriate, supporting ceramic, this, in turn, often being held by supporting metal structures, such as, for example, metal boxes.

Structural parts consisting of solid PGM material have molten glass flowing over or around them and are partly moved in the glass melt.

PGM (Platinum Group Metals) materials, because of their high melting point, are distinguished by high temperature resistance and, furthermore, by high mechanical strength and resistance to abrasion and are therefore especially suitable for the production of structural parts in plants or plant parts which come into contact with the glass melt. Suitable materials are platinum and alloys of platinum and/or of other PGM metals.

The prior art, as described in DE 43 26 143 A1, discloses a plunger which consists of a core consisting of molybdenum, tungsten or of an alloy of these. Furthermore, the plunger has a ceramic body which is provided with a covering consisting of platinum or of a platinum-rich alloy. The ceramic body serves for preventing intermetallic diffusion, specifically between the metal core and the platinum covering.

The plunger has the disadvantage, however, that the layer build-up with the molybdenum or tungsten core is relatively complicated. A further disadvantage is that, if the covering is damaged, oxidation of the molybdenum or tungsten core occurs, with the result that the plunger becomes useless.

Moreover, a plunger needle is known from U.S. Pat. No. 3,332,766, such a plunger needle in this case consisting of an outer cylinder with a hemispherical cap. Furthermore, reinforcing ribs are arranged inside the cylinder. Both the cylinder and the hemispherical cap and also the reinforcing ribs in this case consist of platinum or of a platinum alloy.

SUMMARY OF THE INVENTION

The object of the invention is to provide an improved apparatus which is suitable for being surrounded by molten glass, in order to be used in the glass industry. A further object of the invention is to provide an improved method for processing molten glass.

These objects are achieved by means of an apparatus and a method according to claims 1, 2, 3 and 41 of the present invention.

An especially preferred advantage of the invention is the long and predictable service lives of the apparatus and its relatively low production costs.

In this case, in one embodiment, the apparatus has a shank which consists of at least one at least partially, preferably completely seamless tube consisting of an oxide dispersion-strengthened PGM material, the shank having at least one thickened portion on which an actuating device is fastened, for example, by means of welding. The thickened portion may, in this case, be designed in such a way that the shank has a larger diameter and/or a greater wall thickness. In this case, depending on the intended use or load, the shank may, for example, be stepped downwards and/or have a flowing transition. The stepping or the flowing transition may run from a greater wall thickness to a smaller wall thickness and/or from a larger diameter to a smaller diameter, and vice versa. Also as explained later with reference to FIG. 12a, one or more tubes may in this case be additionally introduced coaxially into the shank. The tubes may in this case have a continuous diameter and a continuous wall thickness or likewise be designed so as to be stepped or with flowing transitions. Furthermore, depending on the intended use, one or more portions of the shank may be reinforced additionally or alternatively from outside by at least one sleeve being pushed on or being shrunk on.

The provision of an at least partially seamless shank composed of oxide dispersion-strengthened PGM material has the advantage that this ODS material considerably increases the resistance to high temperature or the long-time rupture strength at high temperatures of the shank. This is achieved by means of the combination of hard, nonmetallic small particles finely distributed in the PGM material and of a very high mixing density.

A further advantage is that the shank exhibits only a low creep behaviour. The tendency to plastic deformation, that is to say a low creep behaviour, is in this case influenced positively by the admixture of finely distributed dispersoids. For this reason, such oxide dispersion-strengthened materials (referred to in brief as ODS materials) are especially suitable for self-supporting solid PGM structural parts.

A further advantage is that the thickened portion of the shank to which the actuating device is fastened can more effectively absorb forces or mechanical loads, such as, for example, tension, pressure, bending and/or shearing, which act on the shank via the actuating device. Furthermore, longer service lives and, consequently, a higher efficiency of the apparatus can be achieved.

In the further embodiment of the invention the apparatus has a shank which consists of at least one at least partially, preferably completely seamless tube, an actuating device being arranged on the shank, and the shank and the actuating device consisting of an oxide dispersion-strengthened PGM material.

The provision of the shank and of the actuating device consisting of an oxide dispersion-strengthened PGM material has the advantage that, preferably, the service lives can be further prolonged, since due to the ODS material, the actuating device, too, has a higher long-time rupture strength at high temperatures, and also improved corrosion resistance, on account of the textural structure and a lower tendency to creeping.

In a further embodiment of the invention, the shank additionally has a sleeve which is arranged on the shank, at least in a region in which an evaporation or sublimation of the carrying shank occurs during operation. The sleeve may in this case consist, for example, of a PGM material.

The inventor found that the evaporation of the carrying shank during operation can be reduced considerably by the provision of such a sleeve. As a result the material loss on the shank can be reduced and, moreover, higher service lives can be achieved. Owing to the use of a sleeve manufactured from oxide dispersion-strengthened PGM material, the PGM material loss of the sleeve can be reduced, as compared with PGM cast alloys.

The above-described oxide dispersion-strengthened PGM materials, which may be used in the embodiments and exemplary embodiments described in even more detail below, may have, if appropriate, subordinate quantities of base metals as further alloying components or oxidic additives. Typical materials are fine platinum, platinum/rhodium alloys and platinum/iridium alloys. To increase the strength and high-temperature creep resistance, oxide dispersion-strengthened PGM materials may be provided, in which case a small quantity of finely distributed refractory metal oxide, such as, for example, zirconium oxide or yttrium oxide, is added to the PGM material, for example.

The strengthening of platinum materials by means of dispersion strengthening is preferred. The combination of hard, non-metallic small particles finely distributed in the PGM material and of very high mixing density allows a considerable increase in high-temperature resistance. The tendency to plastic deformation, that is to say a low creep behaviour, is also influenced positively by the admixture of finely distributed dispersoids. For this reason, such oxide dispersion-strengthened materials (referred to in brief as ODS materials) are especially suitable as self-supporting solid PGM structural parts. These oxide dispersion-strengthened materials are likewise used in the embodiments and exemplary embodiments described below.

The abovementioned PGM structural parts may, in turn, be built up from individual components, for example, bands, metal sheets, cups and profiles, as a welded structure. In this case, a suitable forming and joining technique is important. Any weld seam leads to a weakening of the mechanical strength of the basic material due to variations in textural structure. Precisely where ODS materials are concerned, it has to be remembered that, in the molten state, the dispersoids coagulate and are partially flushed out, thus adversely influencing the lifetime of the structural part. The avoidance of weld seams, that is to say the use of at least partially or completely seamless individual components, such as, for example, in the case of the claimed shank, is the basis for the efficient implementation of self-supporting solid PGM structural parts.

These seamless individual components then also have to be joined together, for example, welded, into a functioning structural part. It is appropriate, here, to place the weld seams as far as possible in low-stress or stress-free zones. In order to compensate weakening due to the weld seams, there is also the possibility, furthermore, depending on the type and size of the mechanical load—tension, pressure, bending and/or shearing, etc.—to adapt the seamless individual components in their geometry, according to requirements, within the limits of the forming technique, that is to say the use of profiles of stepped diameter and wall thickness or profiles with flowing transitions and seamless spun parts.

The external forces acting on the PGM structural parts are generated, inter alia, by the different primary types of movement of the PGM structural parts in the liquid glass:

Agitators execute a rotational movement.

Needles execute a lifting movement and sometimes, at the same time, a rotational movement.

Plungers or rotary plungers execute a rotational movement, at the same time with a superposed lifting movement.

Vello and down-draw needles (used in the production of glass tubes) do not execute any movements in the operating state. These structural parts are merely rotated at certain time intervals, about their longitudinal axis into a new position in order to avoid permanent deformations of the PGM structural part. External forces are generated mainly by the viscous glass being drawn off, either horizontally to the side or vertically downwards.

By the provision of an apparatus according to claims 1, 2 and 3 with a shank and an actuating device and with a sleeve, the external forces and mechanical loads, such as permanent loads, acting on the apparatus can be absorbed more effectively and, as a result, higher service lives can be achieved.

DETAILED DESCRIPTION OF INVENTION

Figure 2:
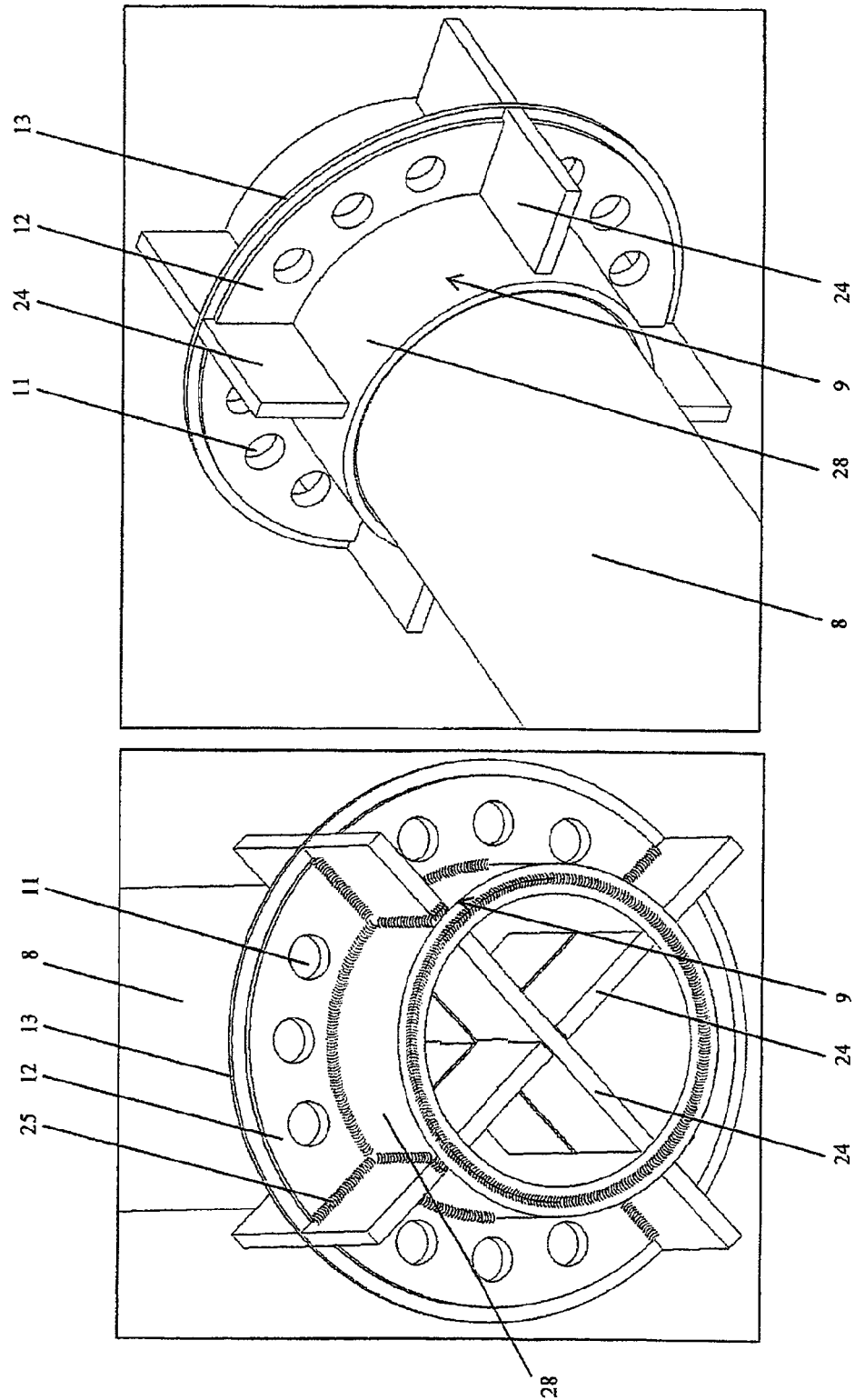
Figure 3:
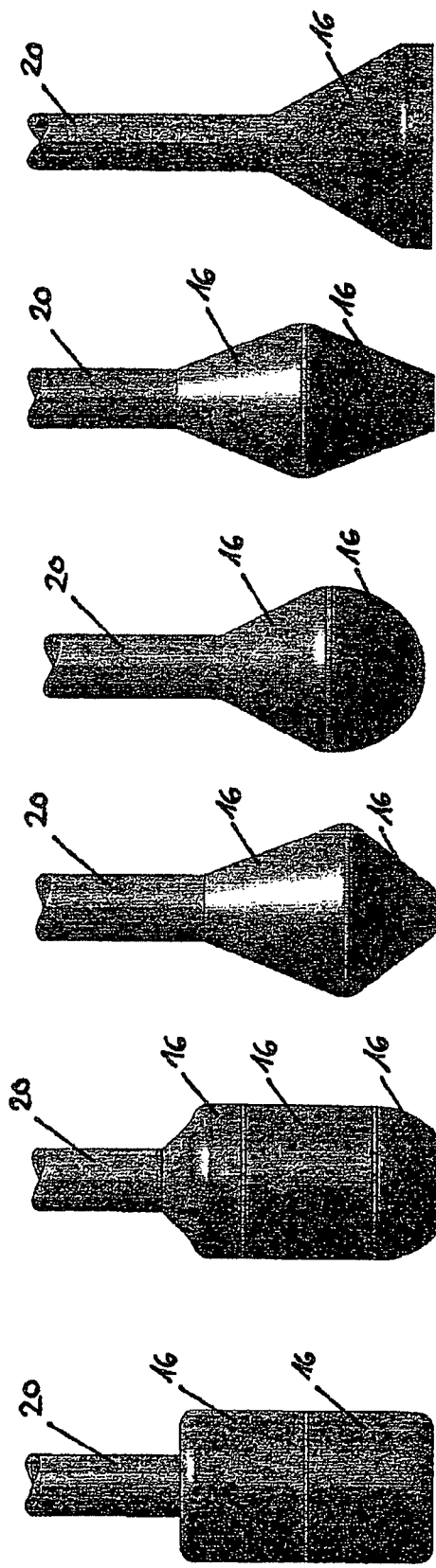
Figure 4:
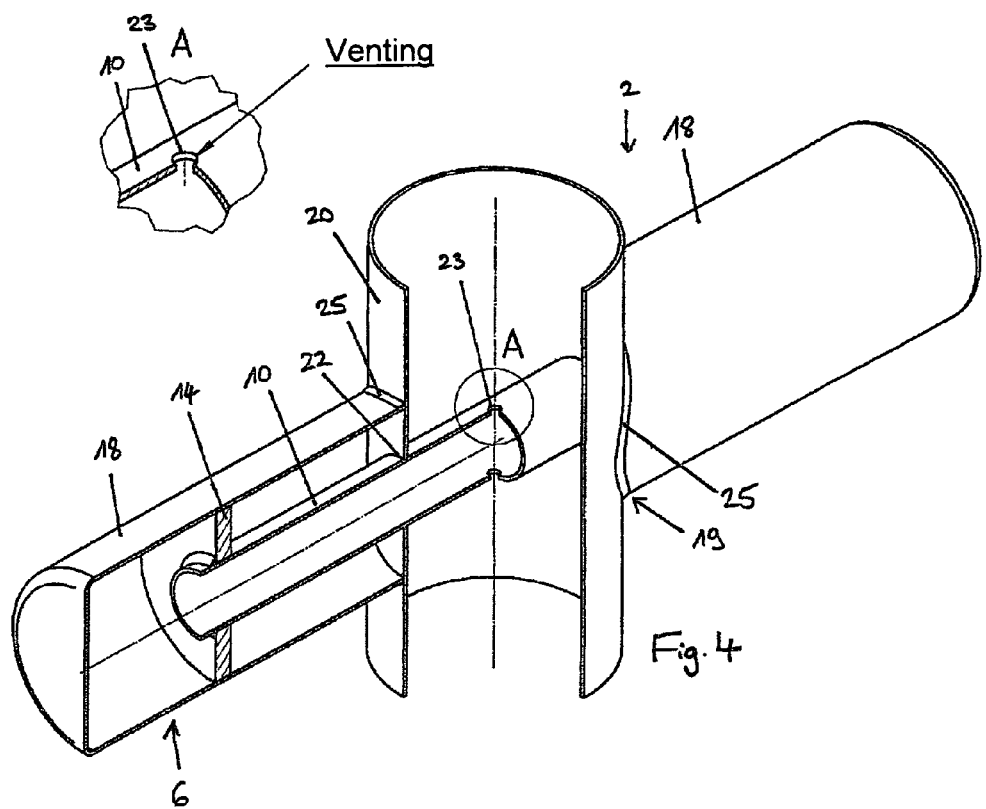
Figure 14A:
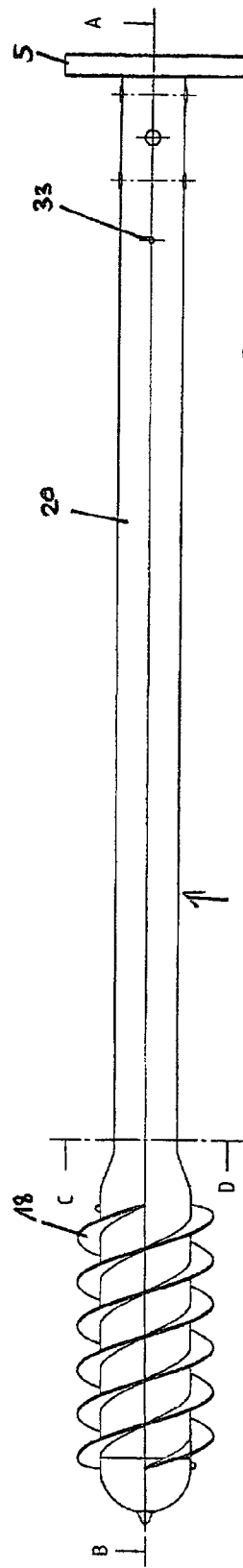
Figure 14B:
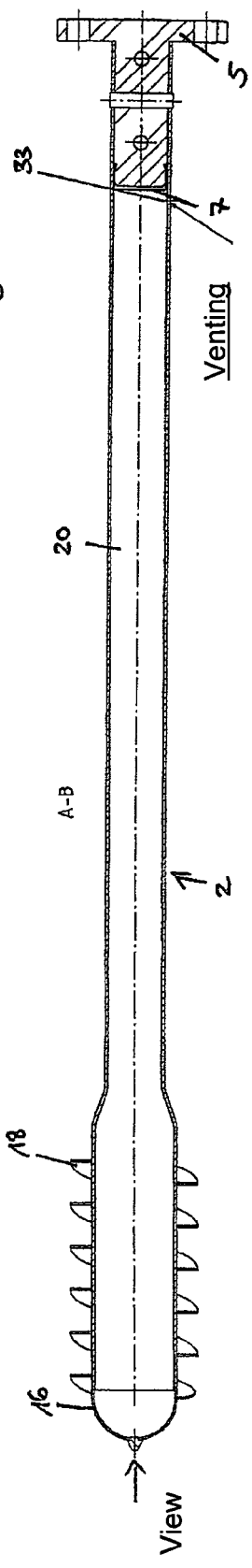
Figure 14C:
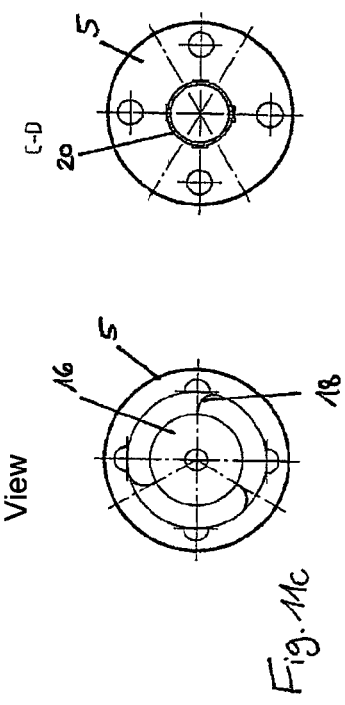

Some preferred embodiments and exemplary embodiments of the invention are explained in more detail below with reference to the present drawings in which:

FIG. 1a shows a longitudinal section through a first embodiment of the apparatus according to the invention, FIG. 1b shows a detail of a view A of the apparatus according to FIG. 1a, FIG. 2a shows a perspective view of a detail of a tubular device of the apparatus according to FIG. 1a from below, a disc element and plate elements being fastened to the tubular device by means of welding, and the tubular device in this case lying on a holder, which is not part of the invention, FIG. 2b shows a perspective view of a detail of the tubular device according to FIG. 2a, from above, the tubular device being shown before welding, FIG. 3 a-f show a side view of an actuating device according to the first embodiment, the actuating device in each case being composed of different actuating elements, FIG. 4 shows a perspective view of a second embodiment of the apparatus according to the invention, FIG. 5a shows a perspective view of a third embodiment of the apparatus according to the invention, a hollow profile being used as a blade element, FIG. 5b shows a perspective view of the third embodiment of the invention, a sheet-like element (obliquely arranged plate) being used as a blade element, FIG. 6a shows an apparatus according to the first embodiment of the invention in the form of an agitator, FIG. 6b shows an apparatus according to the first embodiment of the invention in the form of a needle, FIG. 6c shows an apparatus according to the second embodiment of the invention in the form of a plunger or rotary plunger, FIG. 6d shows a further embodiment according to the invention of the apparatus in the form of a Vello or down-draw needle, FIG. 7a shows a further embodiment according to the invention of the apparatus in the form of a plunger or rotary plunger in a perspective view, FIG. 7b shows a side view of the apparatus according to FIG. 7a, FIG. 7c shows a top view of the apparatus according to FIG. 7a in the direction of the arrow A, FIG. 8a shows an apparatus according to the second embodiment of the invention in the form of an agitator in a perspective view, FIG. 8b shows the apparatus according to FIG. 8a in a side view, with an enlarged detail Z, FIG. 8c shows a top view of the apparatus according to FIG. 8a in the direction of the arrow A, FIG. 9a shows an apparatus according to the first embodiment of the invention in the form of an agitator in a side view, FIG. 9b shows the apparatus according to FIG. 9a in a perspective view, FIG. 9c shows a longitudinal section through the apparatus according to FIG. 9a, with sectional views B-B and C-C and with an enlarged detail Z, FIG. 10a shows a further embodiment according to the invention of the apparatus in the form of a Vello or down-draw needle in a perspective view, FIG. 10b shows a longitudinal section through the apparatus according to FIG. 10a with an enlarged detail C, FIG. 10c shows a longitudinal section through the apparatus according to FIG. 10a, the longitudinal section being rotated through 90° about the longitudinal axis in relation to FIG. 10b, FIG. 11a shows a further embodiment according to the invention of the apparatus in the form of a helical plunger in a side view, and also an accompanying sectional view C-D, FIG. 11b shows a longitudinal section A-B through the apparatus according to FIG. 11a, FIG. 11c shows a top view of the apparatus according to FIG. 10b in the direction of the arrow X, FIG. 12a shows various embodiments of a blade element in cross section, the blade element being a sheet-like element, FIG. 12b shows further embodiments of the blade element in cross section, the blade element having a closed profile or rather a hollow profile, FIG. 13a-f shows various embodiments of the shank of the apparatus according to the invention, the shank being illustrated in longitudinal section, FIG. 14 shows various embodiments of the shank, the shank being illustrated in cross section.

DETAILED DESCRIPTION OF INVENTION

FIG. 1a shows a longitudinal section through a first embodiment of the apparatus 2 according to the invention. The apparatus 2 is in this case designed, for example, as an agitator and has a shank 20 and an actuating device 4 which are moved via a drive (not illustrated). For this purpose, a drive or holding flange 5 is provided on the shank 20. This drive or holding flange 5 is in this case received in the shank 20 and is provided with a protective cap 7 which preferably consists of a PGM material including, for example, oxide dispersion-strengthened PGM material.

The shank 20 of the apparatus 2 according to the invention has at least one at least partially or completely seamless tube which preferably consists of an oxide dispersion-strengthened PGM material or at least comprises this material. The shank 20 has a first thickened portion 9, on which the actuating device 4 is fastened, preferably by means of welding. Welding in this case constitutes a possibility of stable and glass-tight fastening.

As shown in FIG. 1a, the first thickened portion 9 may in this case be formed, for example, by virtue of the preferred provision of a sleeve 28. The sleeve 28 preferably consists of a PGM material, more preferably of an oxide dispersion-strengthened PGM material or of another suitable material. This sleeve 28 is fastened, at least glass-tight, to the shank 20 and may, for example, be pushed or shrunk on to the shank 20. In addition to the sleeve 28 or instead of the sleeve 28, the shank 20 may preferably have a larger diameter and/or a greater wall thickness. The shank may in this case be designed on the outside and/or on the inside with a flowing transition and/or so as to be stepped in terms of diameter and/or wall thickness.

As shown in FIG. 1a, the actuation device 4 is fastened to the sleeve 28 by means of a continuous weld seam 25, the sleeve 28 forming the first thickened portion 9 of the shank 20. Alternatively, however, the first thickened portion 9 may also be formed, for example, by a greater wall thickness of the shank 20. In this instance, the actuating device 4 is welded directly to the shank 20 in the region of the first thickened portion 9.

The thickened portion 9 has in this case the advantage that it can compensate the weakening caused by the weld seam 25 and at the same time can absorb the forces which act on the connection to the actuating device 4, for example tensile, compressive, shearing and/or bending forces, etc. Higher service lives can be achieved therefore by means of which the efficiency of the apparatus 2 can be improved considerably. This also applies particularly to the second thickened portion 15, to which the actuating device may likewise be fastened, as shown in FIG. 1a, with the result that the second thickened portion 15 has to absorb a higher load than the first thickened portion 9. The second thickened portion 15 is dealt with in more detail below.

Furthermore, at one end of the shank 20, a tubular device 8 is provided which corresponds here, in the first embodiment, to a prolongation of the shank 20. This tubular device 8 is pushed into the actuating device 4. As may be gathered from FIG. 1a, 1b and 3a-3f, the actuating device 4 is composed of one, two or more actuating elements 16 which are preferably seamless spun parts.

The actuating device 4 is in this case composed of actuating elements 16, for example, in the form of a cylinder, of a cone, of a cone frustum and/or of a spherical segment, this list not being conclusive. For the radial support and/or fastening of the actuating elements 16 at least one disc element 12 is provided on the tubular device 8 or the prolongation of the shank 20. The disc element 12 in this case consists preferably of a PGM material, especially preferably of an oxide dispersion-strengthened PGM material, or alternatively of another suitable material. For weight reduction, the disc element 12 may have orifices or bores 11. The actuating elements 16 and the disc element 12 may in this case be welded to one another in order to form the actuating device 4.

As shown in FIGS. 2a and 2b, the disc element 12 may selectively have on its outer circumference a projection 13 which is at least partially or completely peripheral. The actuating elements 16 are in this case pushed on to the disc element 12 and at the same time come to bear against the projection 13. The two actuating elements 16 and the disc element 12 can thus be positioned with respect to one another and subsequently welded to one another. The projection 13 may in this case project somewhat beyond the actuating elements 16 on the outside and be used to form a weld seam.

Furthermore, at least one plate element 24 for absorbing axial forces may selectively be provided on one or on both sides of the disc element 12. As shown in the detail of the view A in FIG. 1b, the respective actuating element 16 has a clearance or slot 30, into which the upper end 27 of the corresponding plate element 24 is received. The actuating elements 16, the disc element 12 arranged between them and the two plate elements 24 may be welded to one another at a later stage.

Basically, the two actuating elements 16 may also be welded directly to one another, in which case no disc element 12 is arranged between them and/or no plate element 24 is received in a slot 30 of the respective actuating element 16. Instead, the disc element 12 may bear against the inner circumference of at least one of the actuating elements 16 and selectively be welded to this from inside. This also applies to the plate elements 24. These may likewise bear against the inner circumference of the actuating elements 16 and selectively be welded to the actuating elements 16 from the inside. The actuating element 16 correspondingly has no slot 30 in this case.

Preferably, on the tubular device 8 or the prolonged shank 20, a second thickened portion 15 may be provided, on which the disc element 12 and the plate elements 24 are arranged. As illustrated in FIG. 1a, the second thickened portion 15 may in this case be formed on the tubular device 8 by virtue of the provision of a sleeve 28. The sleeve 28 in this case likewise consists preferably of a PGM material, especially preferably of an oxide dispersion-strengthened PGM material or of another suitable material. The sleeve 28 may, for example, be pushed or shrunk onto the tubular device 8. In this case the two sleeves 28 which are used on the first and the second thickened portion 9, 15, may also be designed (not illustrated) as a continuous sleeve. In addition to the sleeve 28 or instead of the sleeve 28, the tubular device 8 itself may be of thickened design. As in the case of the first thickened portion 9, the tubular device 8 may in this case have a larger diameter and/or a greater wall thickness. For this purpose the tubular device 8 may correspondingly be designed on the inside and/or on the outside with a flowing transition and/or so as to be stepped.

Furthermore, the tubular device 8 and the sleeve 28 may in each case be provided with a corresponding break-out 26, through which the respective plate element 24 is pushed, as shown in FIGS. 2a and 2b. In FIG. 2a, which shows the tubular device 8 from below, the plate elements 24 are welded continuously to the disc element 12 and the sleeve 28. The disc element 12 in this case is likewise welded all round to the sleeve 28. FIG. 2b, in which the tubular device 8 is shown from above, shows, in turn, the sides of the disc element 12 and of the respective plate elements 24 before welding.

In principle, the number and position of the weld seams 25 may also be provided differently, insofar as a sufficient fastening of the disc element 12, of the plate elements 24 and of the sleeve 28 is ensured. As indicated in FIG. 1a by a broken line and as is shown in FIG. 2a, the sleeve 28 may be prolonged as far as the end of the tubular device 8 and be optionally welded to the lower end of the tubular device 8. However, as shown in FIGS. 1a and 2b, the sleeve 28 is preferably not welded at its upper end to the tubular device 8, since here, for example, forces act by the actuating device 4 and a weld seam would lead to weakening.

For the additional support of the inner circumference of the actuating device 4 or of its actuating elements 16 or to increase the dimensional rigidity of these, at least one supporting ring 32 may be provided, which bears against the inner circumference of the corresponding actuating element 16 and which is selectively welded to the latter.

Furthermore, blade elements 18 may be fastened to the actuating device 4, preferably by means of welding. These blade elements 18 may in this case be formed from solid parts or hollow parts, as shown by way of example in FIG. 12a, b. The blade elements 18 are in this case preferably made from PGM material, especially preferably from oxide dispersion-strengthened PGM material or from another suitable material. The blade elements 18 may in this case also have a set-up, such as is described below with reference to the second and the third embodiment of the apparatus according to the invention.

Overall, the shank 20 and at least parts of the actuating device 4, that is to say preferably the parts of the actuating device 4 which come into contact with the glass, consist of a PGM material, preferably of oxide dispersion-strengthened PGM material or of another suitable material. Alternatively, however, all the parts of the actuating device 4, including the disc element 12, the plate elements 24, the sleeve 28, the supporting ring 32, and the blade elements 18, may also be made from a PGM material, preferably from oxide dispersion-strengthened PGM material or of another suitable material. By contrast, the drive or holding flange 5 may be made, for example, from a heat-resistant steel, since the temperature outside the molten glass is correspondingly lower. The actuation device 4 and the shank 20 or the tubular device 8 are preferably vented (not illustrated) inside the apparatus 2.

Some examples of the configuration of the actuating device 4 are explained below in more detail with reference to FIG. 3a-3f. In FIG. 3a the actuating device 4 is composed of two cylindrical actuating elements 16. Further, the actuating device 4 in FIG. 3b is composed of a partially conical actuating element 16 and in each case a cylindrical and a hemispherical actuating element 16. In FIGS. 3c and 3e, the actuating device 4 is composed in each case of two conical actuating elements 16. Furthermore, in FIG. 3d the actuating device 4 is composed of a conical and of a hemispherical actuating element 16. In FIG. 3f the actuating device 4 is formed from a conical actuating element 16 having a cylindrical portion.

The second embodiment of the apparatus 2 according to the invention is explained in more detail below according to FIG. 4.

The apparatus 2 is in this case designed, for example, as an agitator which has a shank 20 and an actuating device 6 which are moved via a drive (not illustrated). For this purpose, as shown in FIG. 1a of the first embodiment, a drive or holding flange may be provided on the shank 20. This drive or holding flange (not illustrated) is in this case received, for example, in the shank 20 and is provided with a protective cap.

FIG. 4 shows a detail of the shank 20 of the apparatus according to the invention which is provided with an actuating device 6 which has two blade elements 18. As has already been described in detail above with reference to the first embodiment, the shank 20 in this case has at least one at least partially or completely seamless tube which preferably consists of an oxide dispersion-strengthened PGM material or at least comprises this material. The shank 20 in this case has a portion 19 to which the actuating device 6 is fastened.

The portion 19 may in this case selectively be designed as a thickened portion (not illustrated) to which the actuating device 6 or its blade elements 18 are fastened. The thickened portion serves for compensating the weakening of the shank 20 due to the welding-on of the blade element 18. In this case, correspondingly to the first embodiment, the thickened portion may be achieved by a sleeve being pushed or shrunk on to the shank 20. The sleeve in this case may preferably be made from a PGM material, especially preferably from an oxide dispersion-strengthened PGM material or from another suitable material. In addition to the sleeve or instead of the latter, the shank 20 may have a larger diameter and/or a greater wall thickness. The shank 20 can in this case be designed to be stepped inwards and/or outwards and/or with a flowing transition.

Provided on the shank 20 is an actuating device 6 which, as shown in FIG. 4, has, for example, two or more blade elements 18. A tube of smaller diameter or a tubular device 10 is introduced at least partially into the blade elements 18 through an orifice 22 in the shank 20 or the sleeve.

In contrast to the first embodiment, the tubular device 10 is designed as a separate part and, for example, is not welded to the shank 20, in order to avoid an additional weakening (transformation of the textural structure of the ODS material) of the shank. The tubular device 10 may be dimensioned in its dimensions, in particular in its length, such that the blade element 18 has to absorb as low a tilting moment as possible during operation. A tilting moment leads to bending stresses which have to be absorbed by the leak-tight weld seam between the blade element 18 and shank 20. The occurrence of a tilting moment can be reduced or essentially avoided by virtue of the provision of the tubular device 10.

Furthermore, on the tubular device 10, at least one disc element 14 is provided, which serves for the radial support of the blade element 18 and which bears with its outer circumference, preferably continuously or at least partially continuously, against the inner circumference of the blade element 18. The disc element 14 may be connected to the tubular device 10 by means of welding. The number and dimensions, in particular width, of the disc element 14 may be selected as a function of the length of the blade element 18 and as a function of which portions of the blade element 18 are additionally to be supported radially. The same applies correspondingly to the disc element 12 of the first embodiment and to the disc element 36 which is dealt with in more detail below.

The blade elements 18, as shown in FIG. 4, are placed on to the portion 19 of the shank 20. In this case, only two blade elements 18 are illustrated in FIG. 4. However, even only one blade element 18 or more than two blade elements 18 may be provided, as shown, for example, by means of the following FIG. 6c. In addition, at least one supporting ring (not illustrated) may also be provided in the blade element 18 correspondingly to the supporting ring 32 of the first embodiment.

As shown in FIG. 4 and the detail A, the tubular device 10 has at least one orifice 23 for venting. The tubular device 10, which is illustrated partially as a section in FIG. 4, is in this case vented inwards by way of the shank 20 via the orifice 23.

Overall, the shank 20 and at least parts of the actuating device 6, that is to say preferably the parts of the actuating device 6 which come into contact with the glass, consist of a PGM material, preferably of oxide dispersion-strengthened PGM material. Alternatively, however, all the parts of the actuating device 6, including the blade elements 18, the disc element 12, the sleeve and the supporting ring, may also be made from a PGM material, preferably from oxide dispersion-strengthened PGM material or from another suitable material. By contrast, the drive or holding flange does not have to be made from a PGM material, since the temperature outside the molten glass is correspondingly lower. It may be produced, for example, from a "base" material, for example, a heat-resistant steel.

FIGS. 5a and 5b illustrate a third embodiment of the apparatus 2 according to the invention. In this case, the shank 20 of the apparatus 2 likewise preferably has a thickened portion 21 which may be designed in the same way as the thickened shanks 9, 15 described above, that is to say with a larger diameter and/or a greater wall thickness and/or a sleeve. In the illustration in FIG. 5a, a sleeve 28 is welded to the shank 20 in order to form the thickened portion 21. Alternatively, however, the sleeve 28 may also be pushed or shrunk on to the shank 20. In this case, the shank 20 and the sleeve 28 have a corresponding orifice 22 through which the blade element 18 in the form of a closed tube is led. The blade element 18 is in this case welded continuously to the thickened portion 21. The thickened portion 21 in this case compensates the weakening due to the weld seam 25. For venting, the blade element 18 may have at least one orifice 23, as shown in FIG. 5a and the detail A. The blade element 18 is in this case vented inwards, and the air is discharged outwards later via a further orifice in the shank 20 above the glass level. This principle may be applied to all the embodiments.

Alternatively or additionally, instead of a blade element 18 with a hollow profile in FIG. 5a, at least one blade element 18 with a sheet-like profile may also be welded to the thickened portion 21, preferably by means of a continuous weld seam 25. As already described above, the thickened portion 21 is in this case formed by the sleeve 28 which is welded to the shank 20 in each case by means of a preferably continuous weld seam. In FIG. 5b, for example, two blade elements 18 in the form of sheet-like elements are welded on. Basically, these two blade elements 18 may also be designed as one continuous blade element 18 (not illustrated) which is led through corresponding orifices in the thickened portion 21 and is fastened to the latter by means of welding.

The venting of the weld seams 25 of the blade elements 18 is illustrated in FIG. 5b and the detail A. The venting serves for discharging air, which is formed during welding between the weld seams 25, inwards into the shank 20, where it is subsequently discharged outwards via an orifice in the shank 20 above the glass level. The shank 20 in this case has at least one orifice 29 for venting which is arranged opposite the blade element 18 with its weld seams 25. The sleeve 28 in this case preferably has a clearance 31 which lies with the orifice 29 opposite the blade element 18 and its weld seams 25. As shown in FIG. 5b, the clearance 31 may in this case be designed, for example, as a continuous depression, since this is easy to produce in manufacturing terms.

Various embodiments of the apparatus 2 according to the invention are shown in FIG. 6a-6d.

FIG. 6a shows the apparatus 2 according to the invention as an agitator. The agitator executes, for example, a rotational movement in an operating state. Furthermore, as illustrated in FIG. 6a, the agitator has as an actuating device 4 an essentially cylindrical basic body on which various blade elements 18 are arranged. However, the agitator may basically assume any other shape, for example shapes such as are shown in FIG. 3a-3f and 6b-6d and combinations of these. This also applies correspondingly to the needles described below in FIGS. 6b and 6d, and to the plunger in FIG. 6c.

In FIG. 6b the apparatus 2 according to the invention is designed as a needle. In an operating state the needle executes, for example, a lifting movement and/or, at least intermittently, a rotational movement. The needle has, furthermore, an actuating device 4 which is composed of a conical, of a cylindrical and of a hemispherical actuating element 16.

Moreover, in FIG. 6c, the apparatus 2 according to the invention is designed as a plunger or rotary plunger. In this case in an operating state, the plunger executes a rotational movement and/or a lifting movement. The plunger is in this case composed of a spherical and of a conical actuating element 16, blade elements 18 being additionally fastened as further actuating elements to the shank 20.

Further, in FIG. 6d, the apparatus 2 according to the invention is designed as a Vello or down-draw needle. The needle may in this case be rotated about its axis at predetermined time intervals, while it otherwise executes essentially no movement. The needle in this case has a conical actuating device 4 with a cylindrical portion.

In FIG. 7a-c, an exemplary embodiment of the third embodiment of the invention is shown which in this case is designed as a plunger. The plunger has a seamless shank 20, at the upper end of which is provided a drive or holding flange 5 which has a protective cap 7. The shank 20 has at its lower end an actuating device 4 in the form of a thickening or bell. The actuating device 4 in this case may be composed, for example, of three actuating elements 16, a conical, a cylindrical and a hemispherical actuating element 16. The actuating device 4 may additionally be stiffened further from inside by at least one supporting ring 32, in which case the supporting ring 32 may selectively be welded to the actuating device 4 on the inside.

Furthermore, the shank 20 has a continuous sleeve 28, to which three closed tubular blade elements 18 are fastened as a further actuating device, for example, by means of welding. The three tubular blade elements 18 are in this case led through corresponding orifices in the shank 20 and in the sleeve 28. As shown in FIG. 7a, the arrangement of the blade elements 18 may form, for example a type of spiral.

The apparatus can be vented outwards via at least one orifice 33 at the upper end of the shank 20, above the glass level. The blade elements 18 themselves may be vented, for example, according to what is shown in FIG. 5a, b. This principle may be applied to all the embodiments.

Moreover, an exemplary embodiment of the second embodiment of the invention is illustrated in FIG. 8a-c. The apparatus 2 is in this case designed, for example, as an agitator and has a multiplicity of blade elements 18 which are reinforced in each case via a tubular device 10 and corresponding disc elements 14. The blade elements 18 are in this case fastened to a portion 19 of the shank 20 preferably by means of welding. As has already been described in detail with reference to FIG. 4, the portion 19 may in this case be designed as a thickened portion (not illustrated). A tubular device 10 is introduced through corresponding orifices 22 through the shank 20 into the blade elements 18, the tubular device 10 preferably not being welded to the shank 20. A disc element 14 is fastened to the tubular device 10 at each of the two ends in order to support the blade elements 18 additionally radially. For venting, an orifice 23 is provided in the tubular device 10, in order to vent the latter and the blade elements 18.

The blade elements 18 are arranged, for example, spirally on the shank 20 of the apparatus 2. At the upper end of the shank 20, a drive or holding pin 5 is provided, which has a protective cap 7 at its lower end.

In this exemplary embodiment, an additional sleeve 37 is arranged on the shank 20, for example, in the region of the glass level. The sleeve 37 in this case projects above a glass level by a predetermined length L1, for example, of 10 mm-100 mm or preferably of 80-100 mm, and/or extends with a predetermined length L2, for example, of 10-20 mm, below the glass level. In principle, the length L1 may even be markedly greater than 100 mm. The length L1 should be selected such that the sleeve 37 covers a part of or the entire region of the shank 20 where evaporation occurs. This applies correspondingly to the length L2. The selected length L2 may likewise be greater than 20 mm or lower than 10 mm, insofar as evaporation of the shank 20 can be suitably reduced or prevented.

The inventor found that the evaporation of the shank 20, which occurs, for example, during the agitation of molten glass, can be prevented by virtue of the provision of the sleeve 37 described above. Hitherto, during the evaporation process, an appreciable part of the shank has evaporated, and therefore the shank or the agitator loses weight with progressive use, with the result that the service life of the agitator is reduced. This is prevented by the sleeve 37 according to the invention. The sleeve 37 may in this case be produced from an alloy similar to the protective cap 7, for example from a PGM material or another suitable material. Basically, an oxide dispersion-strengthened PGM material may also be used.

The sleeve 37 may be fastened to the shank 20 by being pushed on or shrunk on. Basically, however, it may also be fastened to the shank 20 by means of welding, insofar as it has no carrying function, as is the case in FIG. 8b.

Alternatively, the sleeve 37 may also be arranged (not illustrated) at a distance from the glass level, the distance being selected such that an evaporation of the shank 20 can be suitably prevented or reduced.

The sleeve 37 may be employed in all the embodiments and exemplary embodiments described. It is also conceivable in this case to combine the two sleeves 28, 37 into one continuous sleeve, instead of designing each of the sleeves 28 and 37 as an individual part, as described above.

FIG. 9a-c illustrate a further exemplary embodiment of the apparatus 2 according to the invention in the first embodiment. In this case, the agitator first has a shank 20, at the upper end of which is provided a drive or holding flange 5 which has a protective cap 7. Furthermore, the shank 20 has at its lower end a tubular device 8 (prolongation of the shank 20) which is introduced into an actuating device 4. The actuating device 4 consists, for example, of three actuating elements 16. Moreover, a sleeve 28 is provided on the tubular device 8, in order to form a thickened portion to which the actuating element 16 is fastened by means of welding. A plurality of plate elements 24 are inserted through the sleeve 28 and the tubular device 8. In addition, at least one supporting ring 32 may also be provided, in order to increase the dimensional rigidity of the actuating device 4. Furthermore, a disc element 36 is provided for centring the tubular device 8. The disc element 36 in this case has an orifice through which the tubular device 8 is led. The disc element 36 is in this case fastened to the actuating element 16 on the inside, for example by means of welding. Further, a disc element 12 is provided, which may have, for example, a projection 13 as shown in the enlarged detail Z. The two actuating elements 16 are in this case pushed on to the disc element 12 and bear against the projection 13. The actuating elements 16 and the disc element 12 are in this case connected by means of welding. Alternatively, the two actuating elements 16 may also be welded directly to one another, and the disc element 12 may be welded to an actuating element 16 from the inside, as already stated in detail in the description relating to FIGS. 1, 2a and 2b.

Blade elements 18 in the form of sheet-like elements are fastened to the outside of the actuating device 4, for example, by means of welding. Additionally, or alternatively, the blade elements 18 may also have a closed profile, as shown, for example, in FIG. 11b.

FIG. 10a-c show a fourth embodiment according to the invention which is similar to the first embodiment. In this case the apparatus is designed, for example, as a Vello needle or down-draw needle and has a bell-shaped actuating device. The shank 20 is in this case provided at one end with a drive or holding flange 5, a detail of this being shown in FIG. 10a-c. The drive or holding flange 5 has a protective cap 7 at its lower end. The shank 20 is provided at its other end with a thickened portion. The thickened portion may in this case be formed by a larger diameter and/or a greater wall thickness and/or a sleeve 28, comparably to the thickened portions 9, 15 and 21. In the illustration in FIG. 10a-c, the shank 20 is provided outwardly, for example, with a stepped wall thickness. The shank 20 in this case becomes thinner downwards, since the transverse forces and the bending moment profile increase upwards and the shank 20 therefore has to have a thicker design at the top, whereas it may have a thinner design at the bottom. This, however, is only one example of a load situation. In the reverse load situation, the selected wall thickness of the shank 20 would, for example, have a thicker profile downwards. So as not to weaken the shank 20 by a weld seam, a sleeve 28 is provided, which forms the thickened portion. In this case, an actuating element 16 is fastened to the sleeve 28 by means of welding, as illustrated in the detail C of FIG. 10*b*. To absorb the axial forces, plate elements 24 may additionally be provided, which are inserted through the shank 20 and are welded to the actuating element 16 from inside. The actuating element 16 is closed at the lower end by means of a cover 34 having an orifice 35. The venting of the apparatus 2 has not been illustrated in FIG. 10*a-c*.

Furthermore, a fifth embodiment of the apparatus 2 according to the invention is shown in FIG. 11*a-c*. The apparatus 2 is in this case designed, for example, as a plunger. The shank 20 is in this case provided at one end with a drive or a holding flange 5 which has a protective cap 7 at its lower end. The shank 20 is widened in diameter at its other end in order to form an actuating device. The shank 20 is in this case closed at its end by means of a hemispherical actuating element 16. A spiral blade element 18 is fastened to the outside of the widened portion, preferably by means of welding. For venting, the shank 20 has an orifice 33 above the glass level (not illustrated) in order to discharge the air inside the shank 20 outwards.

Sundry variations of the blade elements 18, such as are used in the embodiments and exemplary embodiments described above, are illustrated in FIGS. 12*a* and 12*b*. FIG. 12*a* shows various shapes of blade elements 18 illustrated in cross section. The blade elements 18 are in this case designed in the form of sheet-like elements. FIG. 12*b* illustrates, furthermore, blade elements 18 in the form of closed profiles or rather hollow profiles in cross section. Both the sheet-like elements in FIG. 12*a* and the hollow profiles in FIG. 12*b* may be arranged, for example, as single-flight or multi-flight spirals. It is obvious to an average person skilled in the art, however, that the sheet-like elements or hollow profiles may be arranged on the shank 20 or the actuating device and combined with one another in any desired way, depending on their function.

FIG. 13*a-f* and 14 illustrate various shapes for the shanks 20, such as may be used in the embodiments and exemplary embodiments described above, the shanks 20 preferably being of seamless or at least partially seamless design. The shanks 20 may in this case have a continuous wall thickness (FIG. 13*a*) or a stepped wall thickness (FIG. 13*b*). Furthermore, the shank 20 may also have a continuously identical wall thickness, but a stepped diameter (FIG. 13*c*). Moreover, the shank 20 may also have a stepped wall thickness and a stepped diameter (FIG. 13*d*). Furthermore, according to FIGS. 13*e* and 13*f*, the shank 20 may also have a plurality of shanks inserted coaxially one in the other, in which case these shanks 20 may be shanks according to FIG. 13*a*, b, c and/or FIG. 13*d*. Instead of a stepping, flowing transitions may also be formed. FIG. 14 shows possible radial cross sections of the shanks suitable for the invention.

The elements, described above with reference to the figures, of the various embodiments of the apparatus according to the invention, including, inter alia, the shanks 20, tubular devices 8, 10, actuating devices 4, 6 with actuating elements 16, disc elements 12, 14, 36, supporting rings 32, sleeves 28, 37, plate elements 24, protective caps 7 and blade elements 18, are preferably all or at least parts of them made from a PGM material, preferably from oxide dispersion-strengthened PGM material or from another suitable ODS material. However, the drive or holding flange, basically, does not necessarily also have to be produced from a PGM material or oxide dispersion-strengthened PGM material. Alternatively, as described above, it may however also be produced from a "base" material, such as, for example, a heat-resistant steel. The shank 20, as described above in the embodiments, is preferably seamless, but at least partially seamless. The same also applies to the actuating elements 16, these, too, being seamless or at least partially seamless.

The disc elements, plate elements and/or supporting rings may be provided with orifices 11 for weight reduction.

Furthermore the various embodiments and exemplary embodiments, as described above with reference to the drawings, may be combined with one another, in particular individual features of these.

In particular, the configuration of the actuating device in the first embodiment may also be combined with the reinforced blade elements of the second embodiment. Thus, an apparatus is possible which has an actuating device according to the first embodiment and, in addition, at least one blade element according to the second embodiment. This applies likewise to the other embodiments illustrated in the figures.

Moreover, the actuating elements 16, blade elements 18 and disc elements 12, 14, 36, as illustrated, for example, in FIGS. 4, 5*a*, 6*c*, 7*a-c*, 8*a-c* and 9*a-c*, do not necessarily have to have a round cross section. The blade elements 18 may also have cross sections, as illustrated in FIG. 12*b*. This also applies correspondingly to the actuating elements 16 and the disc elements 12, 14, 36, connected to them, and also the tubular device 8, 10.

The embodiments described above are used in a temperature range with a mean operating temperature of 1000° C.-1500° C. In this temperature range, torques of, for example, up to 100 N·m may be achieved, or torques in ranges of, for example, 10 N·m to 30 N·m or 30 N·m to 80 N·m or up to 100 N·m, with service lives of several years. Furthermore, the length of the agitators or plungers, etc. according to the invention may lie, for example, between 1 m and 2.5 m. The blade elements may have an overhang of up to 500 mm in diameter. As regards the material, quantities of, for example, up to 50 kg of PGM material or oxide dispersion-strengthened PGM material can be processed.

LIST OF REFERENCE SYMBOLS

2 Apparatus
4 Actuating device
5 Drive or holding flange
6 Actuating device
7 Protective cap
8 Tubular device
9 First thickened portion
10 Tubular device
11 Orifice (disc element)
12 Disc element
13 Projection
14 Disc element
15 Second thickened portion
16 Actuating element
18 Blade/blade element
19 Portion (on the shank)
20 Shank
21 Thickened portion
22 Orifice (shank)
23 Orifice (venting)

24 Plate element
25 Weld seam
26 Break-out
27 Upper end (of the plate element)
28 Sleeve
29 Orifice (shank)
30 Slot (in the actuating element for receiving the upper end of the plate element)
31 Clearance (sleeve)
32 Supporting ring
33 Orifice
34 Cover
35 Orifice
36 Disc element
37 Sleeve

The invention claimed is:

1. An apparatus for use in processing molten glass, the apparatus comprising
a shank having at least one tube which is composed, at least in part, of an oxide dispersion-strengthened PGM material;
an actuating device arranged on the shank; and
a tubular device, wherein
said actuating device includes a hollow portion,
said shank includes at least one thickened portion at a location where the actuating device is connected to the shank,
said tubular device extends into the hollow portion of the actuating device,
said actuating device is adapted for contacting molten glass,
the shank includes a sleeve for strengthening the shank against evaporation that results from being placed in contact with molten glass, and
the shank includes an orifice, and there is arranged a clearance between the shank and the sleeve, at a location adjacent to a weld seam of a blade element, for venting air located in a region of the weld seam into an interior of the shank.

2. The apparatus according to claim 1, further comprising an annular support element having a first portion connected to a surface of the tubular device and a second portion connected a surface of the actuating device, for providing structural support to the actuating device during use.

3. The apparatus according to claim 2, wherein the annular support element includes a disc element.

4. The apparatus according to claim 2, wherein the annular support element includes a web structure comprising a plurality of radially extending support elements.

5. The apparatus according to claim 1, wherein
the tube of the shank is seamless at a portion which is adapted to extend from a location above a glass melt surface-level to a location below the glass melt surface-level in an operating state, and the shank is further adapted to connect with a holding device by inserting one of the shank and the holding device into the other.

6. The apparatus according to claim 1, wherein the hollow portion of the actuating device is located in a portion of the actuating device which is configured to be submerged in molten glass in an operating state.

7. The apparatus according to claim 1, wherein the tubular device projects from the thickened portion of the shank.

8. The apparatus according to claim 1, wherein the thickened portion of the shank comprises at least one of: an enlarged wall diameter of the shank, a thickened wall of the shank, and the sleeve on the shank.

9. The apparatus according to claim 8, wherein the thickened portion is the sleeve, and the sleeve is pushed or shrunk on to the shank and is composed, at least in part, of an oxide dispersion-strengthened PGM material.

10. The apparatus according to claim 1, wherein the actuating device is composed, at least in part, of an oxide dispersion-strengthened PGM material.

11. The apparatus according to claim 1, wherein at least one further blade element is fastened to at least one of the actuating device and the shank.

12. The apparatus according to claim 11, wherein the at least one further blade element is welded to the thickened portion of the shank.

13. The apparatus according to claim 11, wherein the tubular device is adapted to support the at least one further blade element in a manner to decrease a tilting moment acting on the at least one further blade element during use.

14. The apparatus according to claim 11, wherein at least one cross section of the at least one blade element or the at least one further blade element is circular, ovally drop-shaped, triangular, polygonal or trapezoidal.

15. The apparatus according to claim 14, wherein at least one cross section of the at least one blade element or the at least one further blade element has a varying wall thickness.

16. The apparatus according to claim 14, wherein the tubular device or a tubular blade element includes at least one orifice for venting, and the at least one orifice is arranged at a position on the tubular device or tubular blade element that is located within the shank.

17. The apparatus according to claim 1, further comprising
at least one disc element connected with the tubular device and configured to reinforce the actuating device, and
at least one of the tubular device and the disc element is composed, at least in part, of an oxide dispersion-strengthened PGM material.

18. The apparatus according to claim 17, wherein at least one further disc element is arranged on the tubular device for centering the tubular device within the actuating device.

19. The apparatus according to claim 17, wherein the actuating device comprises at least one actuating element, and the tubular device is a part of the shank.

20. The apparatus according to claim 19, wherein the actuating device comprises at least two actuating elements which form at least one of a cylinder, a cone, a cone frustum, and a spherical segment.

21. The apparatus according to claim 19, wherein the at least one disc element is arranged to provide radial support to the actuating device.

22. The apparatus according to claim 21, wherein the tubular device has a thickened portion in the region where the disc element and/or a plate element are/is fastened to the tubular device, and the thickened portion comprises at least one of a larger wall diameter, a greater wall thickness, and at least one sleeve.

23. The apparatus according to claim 22, wherein the thickened portion comprises the at least one sleeve, and the at least one sleeve is pushed and/or shrunk on to the tubular device.

24. The apparatus according to claim 19, wherein at least one plate element for absorbing axial forces is fastened to the tubular device and extends through an opening in the tubular device.

25. The apparatus according to claim 17, wherein the disc element comprises at least one of clearances and bores for weight reduction.

26. The apparatus according to claim 1, wherein at least one of the shank and the tubular device includes a seamless tube, the diameter and/or wall thickness of which are/is configured to vary with a stepped or flowing transition.

27. The apparatus according to claim 1, wherein at least one of the shank and the tubular device comprises at least two seamless tubes which are inserted coaxially one in the other.

28. The apparatus according to claim 27, wherein the tubular device comprises two tubes, and the two tubes are composed, at least in part, of an oxide dispersion-strengthened PGM material.

29. The apparatus according to claim 1, wherein the actuating device is an agitator which is configured for a rotational movement in an operating state.

30. The apparatus according to claim 1, wherein the actuating device is a needle which is configured for a lifting movement and/or a rotational movement in an operating state.

31. The apparatus according to claim 1, wherein the actuating device is a plunger which is configured for a rotational movement and/or a lifting movement in an operating state.

32. The apparatus according to claim 1, wherein the actuating device is in the form of a Vello or a down-draw needle which is configured for rotation about its longitudinal axis in an operating state.

33. An apparatus for use in processing molten glass, the apparatus comprising
a shank having at least one tube which is composed, at least in part, of an oxide dispersion-strengthened PGM material;
an actuating device arranged on the shank; and
a tubular device, wherein
said actuating device includes a hollow portion,
said shank includes at least one thickened portion at a location where the actuating device is connected to the shank,
said tubular device extends into the hollow portion of the actuating device,
said actuating device is adapted for contacting molten glass,
at least one blade element is welded to the thickened portion of the shank, and
the tubular device projects through at least one orifice in the thickened portion of the shank and extends at least partially into an interior of the at least one blade element welded to the thickened portion.

34. An apparatus for use in processing molten glass, the apparatus comprising
a shank having at least one tube which is composed, at least in part, of an oxide dispersion-strengthened PGM material;
an actuating device arranged on the shank; and
a tubular device, wherein
said actuating device includes a hollow portion,
said shank includes at least one thickened portion at a location where the actuating device is connected to the shank,
said tubular device extends into the hollow portion of the actuating device,
said actuating device is adapted for contacting molten glass,
at least one blade element is welded to the thickened portion of the shank, and
a disc element is welded to the tubular device, and an outside edge of the disc element is configured to contact an inside of the at least one blade element.

35. An apparatus for use in processing molten glass, the apparatus comprising
a shank having at least one tube which is composed, at least in part, of an oxide dispersion-strengthened PGM material;
an actuating device arranged on the shank; and
a tubular device, wherein
said actuating device includes a hollow portion,
said shank includes at least one thickened portion at a location where the actuating device is connected to the shank,
said tubular device extends into the hollow portion of the actuating device,
said actuating device is adapted for contacting molten glass,
the tubular device includes at least one disc element configured to reinforce the actuating device by providing radial support to the actuating device,
at least one of the tubular device and the disc element is composed, at least in part, of an oxide dispersion-strengthened PGM material,
the actuating device comprises at least one actuating element, and the tubular device is a part of the shank,
the radially supporting, at least one disc element includes a peripheral projection, and
a first side of the peripheral projection is welded to a first actuating element and a second side of the peripheral projection is welded to a second actuating element.

36. An apparatus for use in processing molten glass, the apparatus comprising
a shank having at least one tube which is composed, at least in part, of an oxide dispersion-strengthened PGM material;
an actuating device arranged on the shank; and
a tubular device, wherein
said actuating device includes a hollow portion,
said shank includes at least one thickened portion at a location where the actuating device is connected to the shank,
said tubular device extends into the hollow portion of the actuating device,
said actuating device is adapted for contacting molten glass,
the tubular device includes at least one disc element configured to reinforce the actuating device,
at least one of the tubular device and the disc element is composed, at least in part, of an oxide dispersion-strengthened PGM material,
the actuating device comprises at least one actuating element, and the tubular device is a part of the shank, and
an upper end of a plate element of the at least one disc element is received in a slot of the actuating element and is welded to the actuating element.

37. A method of processing molten glass comprising a step of contacting molten glass with the apparatus according to claim 1.

38. The method according to claim 37, wherein contacting molten glass with the apparatus includes submerging the shank in the molten glass such that the sleeve for strengthening the shank against evaporation is placed in contact with the molten glass.

39. The method according to claim 38, wherein the method includes submerging the shank in molten glass such that the sleeve extends from a location above a glass level of the molten glass to a location below the glass level.

40. The method according to claim 39, wherein the shank is submerged in molten glass such that the length of the sleeve above the glass level is in a range of 10 mm-100 mm, and the length of the sleeve below the glass level is in a range of 10 mm-20 mm.

41. The method according to claim 38, wherein the shank is submerged in molten glass such that the sleeve extends along a length of the shank that is located a distance above the glass level, for strengthening the shank against evaporation that results from being placed proximate to molten glass.

42. The method according to claim 38, wherein the sleeve is composed, at least in part, of a PGM material.

43. The method according to claim 37, wherein the apparatus is used at an operating temperature of 1000° C. to 1500° C., with a torque in a range of 10 N·m to 100 N·m.

44. The method according to claim 37, wherein the apparatus is used with a torque of up to 50 N·m, at an operating temperature of between 1400° C. and 1500° C.

* * * * *